United States Patent [19]
Sato

[11] Patent Number: 5,459,682
[45] Date of Patent: Oct. 17, 1995

[54] MICROCOMPUTER WITH PLURAL REGISTERS AND FUNCTION FOR SELECTING THEM

[75] Inventor: Mitsuo Sato, Kawasaki, Japan

[73] Assignee: Kabushiki Kaisha Toshiba, Kawasaki, Japan

[21] Appl. No.: 233,874

[22] Filed: Apr. 26, 1994

[30] Foreign Application Priority Data

Apr. 27, 1993 [JP] Japan ..................... 5-101490

[51] Int. Cl.$^6$ ..................... G06F 7/38
[52] U.S. Cl. ..................... 364/736
[58] Field of Search ..................... 364/736

[56] References Cited

U.S. PATENT DOCUMENTS 5,307,300  4/1994  Komoto et al. ................. 364/736

FOREIGN PATENT DOCUMENTS 0463855  1/1992  European Pat. Off. .
4-43301   7/1992  Japan .
2216307  10/1989  United Kingdom .

OTHER PUBLICATIONS

Computer Architecture News, vol. 13, No. 4, Sep. 1985, pp. 22–31, M. Huguet, et al., "A Reduced Register File for Risc Architectures".

Primary Examiner—Tan V. Mai
Attorney, Agent, or Firm—Oblon, Spivak, McClelland, Maier & Neustadt

[57] ABSTRACT

A microcomputer having: a register-set portion provided with a plurality of register sets having a plurality of registers, a first memory unit is included for storing select data for selecting the register-sets, a register-set selection unit for selecting the register-sets in accordance with the select data stored in the first memory unit, a second memory unit for storing select data change data for changing the selection of the register sets, a third memory unit for storing, for the purpose of reservation, the select data stored in the first memory unit, and an arithmetic unit for performing predetermined operations using the select data stored in the first memory unit and the select data change data stored in the second memory unit and supplying the results of the predetermined operations to the first memory unit to change the select data.

9 Claims, 2 Drawing Sheets

MICROCOMPUTER WITH PLURAL REGISTERS AND FUNCTION FOR SELECTING THEM

BACKGROUND OF THE INVENTION

The present invention relates to a microcomputer, and more particularly to a microcomputer provided with a device for controlling the switching of tasks when a main program is processed.

The interrupt processing procedure for a microcomputer relevant to the present invention is described hereinbelow.

As shown in FIG. 5, when a reception 12 of an interrupt is made while a program 11 is being processed, an interrupt receiving process 13 is started. In the interrupt receiving process 13, a program status word (hereinafter referred to as PSW) indicating status of a main program which includes flag information is first reserved. This PSW is reserved in a rewritable memory indicated by a stack pointer (hereinafter referred to as SP). Further, information of a program counter (hereinafter referred to as PC) of the main program is reserved in a stack. Subsequently, for assigning a program to be processed by the interrupt, vector information indicating which interrupt requirement is read from a program memory and stored in the PC.

After such an interrupt receiving process 13 has been completed, a register saving process 14 is carried out. In the process 14, the content of a register used immediately before the interrupt reception during the main program process 11 is stored in another rewritable memory. Thereafter, a regular interrupt process 15 is executed.

Upon completion of the interrupt process 15, a return process 16 to the main program is carried out. In this return process 16, the content of the register which has been saved in the rewritable memory is again returned to and stored in the register.

Subsequently, an interrupt return process 17 reads PC information and PSW information of the main program stored in the stack. The thus read PSW information is written into PSW without modification whereas the PC information is written into PC. Thereby, the return to the main program 18 which has been executed at the time of reception of the interrupt process is effected.

However, the above-described microcomputer has the following problems. In the case where the interrupt process is carried out, a process for saving the register used in the main program to the memory as described above is required. Normally, there is a plurality of registers, and time is needed for reserving the data stored in all registers. Furthermore, the memory for storing the data comprises a rewritable memory. Normally, a data RAM is used. Since it takes time for the writing into the data RAM, it also takes time for the storage.

Moreover, in order to return to the main program after completion of the interrupt process, it is necessary to have the return process for restoring the content of the register which has been saved in the rewritable memory to the register. As mentioned above, the register saving and return processes become necessary for relatively every interrupt. The proportion of this processing relative to the whole interrupt process tends to increase as the number of registers increases. In the past, the saving and return process of the register have been carried out by executing a command from a CPU.

As a result, much time is taken to switch the tasks upon interrupt so that it becomes difficult to construct a system suitable for real time processing. Such a problem likewise occurs not only in the interrupt process but in the case of shifting from a main program to a subroutine program.

SUMMARY OF THE INVENTION

It is accordingly an object of the present invention to provide a microcomputer which can shift processing to an interrupt processing or a subroutine program at high speeds to improve real time processing.

According to the present invention, there is provided a microcomputer comprising a register-set portion provided with plural sets of register sets having a plurality of registers; a first memory means for storing select information for selecting the register-sets; a register selection means for selecting the register-sets in accordance with the select information stored in the first memory means; a second memory means for storing select change information for changing the selection of the register-sets; a third memory means for storing, for the purpose of reservation, the select information stored in the first memory means; and arithmetic means for performing predetermined operations using the select information stored in the first memory means and the select change information stored in the second memory means and supplying the results of operations to the first memory means to change the select information.

At the time of interrupt processing, the select information stored in the first memory means is reserved in the third memory means, the predetermined operations are performed between the select information and the select change information stored in the second memory means, and the results of operations are supplied to the second memory means to change the select information, whereby the selection of the register-sets is changed. As described above, in the interrupt receive process, the change of the register-sets when the interrupt is processed is automatically performed without the intervention of a command from the CPU or the like. Therefore, the burden on programming for the interrupt processing is relieved, and in addition, the interrupt receive processing is speeded up.

This operation is carried out not only in the case of shifting from a main program process to an interrupt process but also in the case of shifting from a main program process to a subroutine program.

DESCRIPTION OF THE PREFERRED EMBODIMENTS

Figure 1:
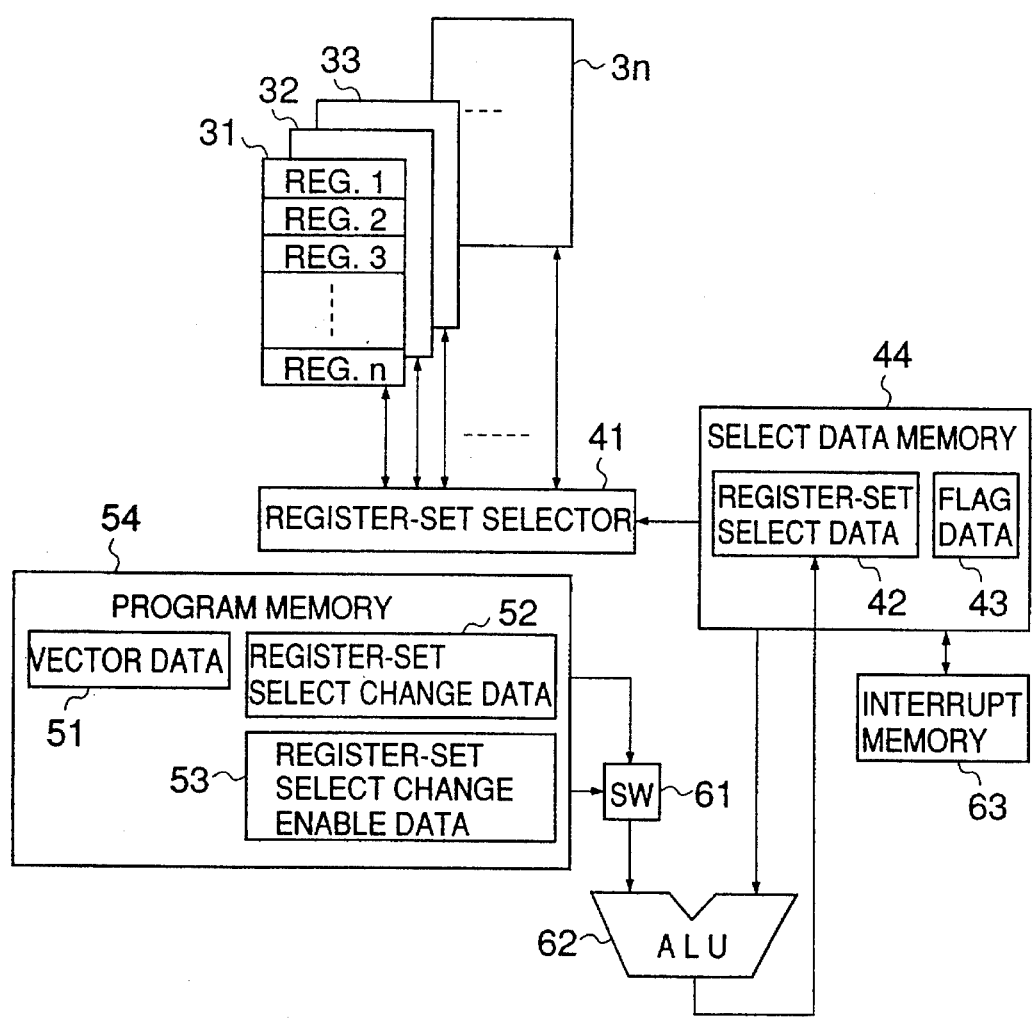
FIG. 1 is a block diagram showing the construction of a microcomputer according to one embodiment of the present invention.

One embodiment of the present invention will be described hereinbelow with reference to the drawings. FIG. 1 shows the construction of a section where interrupt processing is performed in a microcomputer according to the present embodiment.

n sets (n is an integer more than 2) of register sets composed of m (m is an integer more than 2) registers are provided. A register-set selector 41 selects from among a plurality of register-sets 31 to 3n.

The register-set selector 41 performs the selection in accordance with information from a select data memory 44.

The select data memory 44 (a first memory means) stores a PSW indicating the status of the main program. This PSW includes register-set select data 42 indicating which register-set should be selected, and flag data 43 indicating a carry or the like resulting from various operations.

An interrupt memory 63 stores the content of the select data memory 44 which has been used during the main program processing at the time of the interrupt.

A program memory 54 (a second memory means) stores vector data 51, register-set select data change data 52 and register-set select change enable data 53. Of these data, the vector data 51 relates to a leading address of an interrupt service routine. The register-set select data change data 52 indicates data to be added to the register-set select data 42 described later, and is used to obtain information indicating a register-set to be selected at the time of the interrupt. The register set select change enable data 53 indicates permission or denial of the change of the register-set select data 42.

A switching device 61 is opened and closed according to the register-set change enable data 53. When the change is enabled, the switching device 61 is opened to supply the register-set select change enable data 53 to the ALU (ARITHMETIC AND LOGIC UNIT) 62.

The ALU 62 adds the register-set select change enable data 53 supplied from the switching device 61 at the time of the interrupt and the register-set select data 42 supplied from the select data memory 44, and supplies the result thereof to the select data memory 44 to rewrite the register-set select data 42.

Figure 2:
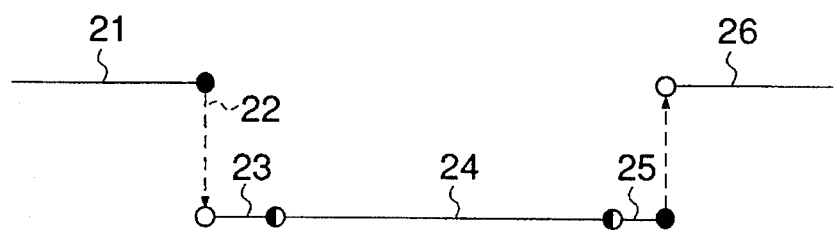
FIG. 2 shows an operation flow showing a processing procedure when an interrupt occurs in the microcomputer of FIG. 1.

The interrupt processing operation in the present embodiment provided with the construction as described above will be described with reference to FIG. 2 showing a procedure of the processing and FIG. 1 mentioned above.

When a request 22 for the interrupt processing is received while a main program 21 is being processed, an interrupt receiving process 23 is started. In the interrupt receiving process 23, the register-set select data 42 stored in the select data memory 44 and the flag data 43 are stored and reserved in an interrupt time memory 63. A storage place at that time is indicated by SP. Data of PC not shown is also reserved in a stack.

From among the data stored in the program memory 54, the register-set select change enable data 53 is read and supplied to the switching device 61. When the change of the register-set select data is permitted, the switching device 61 opens. Thereby, the register-set select data change data 52 supplied to the switching device 61 is outputted to the ALU 62. The register set is sometimes not used in dependency of the interrupt processing. In such a case, the register-set select data 42 need not be rewritten, and therefore, the register-set select change enable data 53 to close the switching device 61 is outputted.

ALU 62 is supplied with the register-set select data 42 outputted from the select data memory 44, and the register-set select data change data 52 is added to the register-set select data 42 and then outputted.

The thus added result is supplied as new register-set select data to the select data memory 44, and the register-set select data 42 is rewritten.

The vector data 51 read out of the program memory 52 is stored in PC.

By the interrupt receiving process 23 as described, the register-set select data 42 stored in the select data memory 44 is changed so as to select a register set different from that at the time of the interrupt. Thereby, it is possible to execute the regular interrupt process 24.

Upon completion of the interrupt process, an interrupt return command (RETI) is executed to effect the interrupt return process 25. The PC data reserved in the stack is read. Further, PW data including the register-set select data 42 reserved in the interrupt memory 63 and the flag data 43 are also read. The thus read PSW data is written into the select data memory 44 without modification. PC data is written into PC. This returns to the main program 26 which has been executed at the time of the interrupt reception.

Various modes are conceived by which one of register-sets 31 to 3n is selected by the interrupt.

Figure 3:
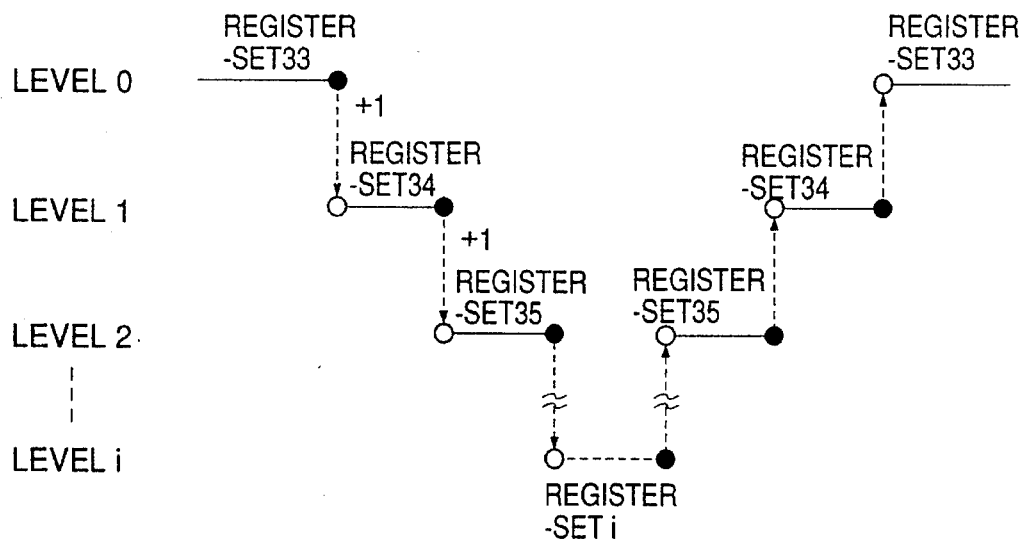
FIG. 3 shows an operation flow of register-set states when an interrupt occurs in the microcomputer of FIG. 1.

For example, in the mode shown in FIG. 3, a multiple interrupt can be made. Register-set select change enable data 53 "1" is added to the register-set select data 42 every interrupt. In the main program processing (a nesting level is 0), the register set 33 is used. When the interrupt (level 1) is made, 1 is added to the register-set select data 42, and the register set 34 is used. When the interrupt (level 2) is further made, 1 is added to the register-set select data 42, and the register set 35 is selected. In this manner, the multiple interrupt from level 1 to arbitrary level i (i is an integer more than 2) can be made. Thereafter, in the interrupt return, the route returns to an original main program in order of level i–1 , . . . , 2, 1, 0 from level i. In the return process, since the register-set select data 42 prior to the reception of the interrupt process which has been reserved in the interrupt time memory 63 is written into the select data memory 44, the return can be made without performing operations such as an addition process.

Figure 4:
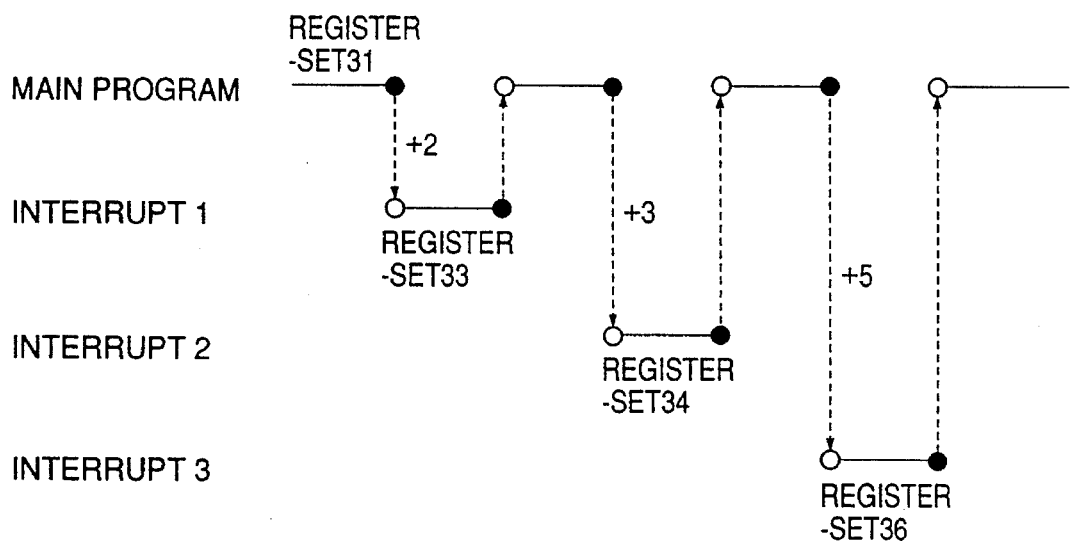
FIG. 4 shows an operation flow of other register-set states when an interrupt occurs in the microcomputer of FIG. 1.
Figure 5:
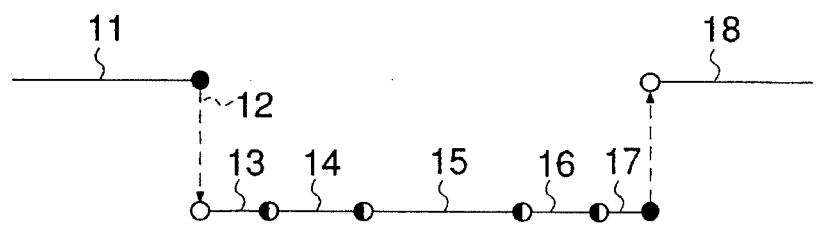
FIG. 5 shows an operation flow of register-set states when an interrupt occurs in a microcomputer relevant to the present invention.

In the mode of the interrupt process shown in FIG. 4, the corresponding relationship between a register set 0 used in advance in the main program and register sets 33, 34 and 36 used in the respective interrupt processes 1 to 3 is fixed. In this case, the multiple interrupt can not be made unlike the mode shown in FIG. 3.

The register set 31 is selected during the process of a main program. The register-set select data 42 "2" is added to the register-set select data change data 52, and the register set 33 is selected. Upon completion of the process of the interrupt 1, the route returns to a main program and the register set 31 is again selected. Thereafter, in the process of the interrupt 2, the register-set select data 42 "3" is added to the register-set select data change data 52, and the register set 34 is selected. After completion of the former, the route returns to a main program, thus returning to the register set 31. In a similar manner, when the interrupt 2 is processed, the register-set select data 42 is added to the register-set select data change data 52, and the register set 34 is selected. After returning to the main program and when the interrupt 3 is processed, the register set 36 is selected.

As described above, in the mode of the interrupt process shown in FIG. 4, the register-set select obtained by adding the register-set select data change data 52 to the register-set select data 42 every occurrence of the interrupt indicates a register set to be selected directly.

According to the aforementioned present embodiment, a burden on a programming necessary for the processing at the time of the interrupt is relieved. More specifically, plural sets of register-sets are provided, and select data of a register-set to be selected at the time of the interrupt is added to the register-set select data change data whereby the register-sets can be automatically switched without the intervention of a command from the CPU, and the processing can be sped up. As a result, even if times of using registers increase, it is possible to process the interrupt in real time.

The above-described embodiments are one example, and the present invention is not limited thereby. For example, while in the above embodiments, the interrupt processing has been described, it is to be noted that also in the case of shifting to a subroutine program during the processing of a main program, the present invention can be applied. Also in this case, similarly to the interrupt process, the content stored in the select data memory 44 is reserved in the interrupt memory 63, and the register-set select data 42 and the register-set select data change data 52 are added so that new register-set select data is written into the select data memory 44. Further, in the present embodiment, the register-set select data change data 52 is added to the register-set select data 42 to obtain select data after changing. However, it is to be noted that a method for operation is not limited to addition but other methods for operation such as subtraction, multiplication and the like can be used.

What is claimed is:

1. A microcomputer comprising:

a register-set portion provided with a plurality of register sets having a plurality of registers;

a first memory means for storing select data for selecting said register-sets;

a register-set selection means for selecting said register-sets in accordance with said select data stored in said first memory means;

a second memory means for storing select data change data, which is used to change the selection of said register sets;

a third memory means for storing, for the purpose of reservation, said select data stored in said first memory means; and an arithmetic means for performing predetermined operations using said select data stored in said first memory means and said select data change data stored in said second memory means and supplying the results of the predetermined operations to said first memory means to change said select data.

2. A microcomputer according to claim 1, wherein in said register-set portion, a register set used in a main program process and a register set used in an interrupt process are predetermined; and the results of predetermined operations conducted using said select data change data stored in said second memory means and said select data stored in said first memory means directly indicate the register set used in the interrupt process.

3. A microcomputer according to claim 1, wherein said select data change data stored in said second memory means is fixed to a predetermined value, and predetermined operations are performed between said select data stored in said first memory means and said predetermined value at every interrupt receiving process.

4. A microcomputer according to claim 1, further comprising:

a fourth memory means for storing select data change enable data indicative of whether or not the change of said select data stored by said first memory means is permitted; and a means for supplying said select data change data stored in said second memory means to said arithmetic means only in the case where in the interrupt receiving process, said select data change enable data stored in said fourth memory means permits the change of said select data.

5. A microcomputer according to claim 1, wherein said arithmetic means for changing the select data is operated such that predetermined operations are performed using said select data stored in said first memory means and said select data change data stored in said second memory means at every processing of the interrupt reception so as to render multiple interrupt process possible, and the results of said operations are supplied to said first memory so as to change said select data at every interrupt process.

6. A microcomputer comprising:

a register-set portion provided with a plurality of register sets having a plurality of registers;

a first memory means for storing select data for selecting said register-sets;

a register-set selection means for selecting said register-sets in accordance with said select data stored in said first memory means;

a second memory means for storing select data change data, which is used to change the selection of said register sets;

a third memory means for storing, for the purpose of reservation, said select data stored in said first memory means when shifting a process from a main program to a subroutine program; and an arithmetic means for performing predetermined operations using said select data stored in said first memory means and said select data change data stored in said second memory means when shifting to process of said subroutine program, and supplying the results of said operations to said first memory means to change said select data.

7. A microcomputer according to claim 6, wherein in said register-set portion, a register set used in the main program process and a register set used in the subroutine program process are predetermined, and the results of predetermined operations conducted using said select data change data stored in said second memory means and said select data stored in said first memory means directly indicate the register set used in the subroutine program process.

8. A microcomputer according to claim 6, wherein said select data change data stored in said second memory means is fixed to a predetermined value, and predetermined operations are performed between said select data stored in said first memory means and said predetermined value every shifting of the process to a subroutine program.

9. A microcomputer according to claim 6, further comprising:

a fourth memory means for storing select data change enable data indicative of whether or not the change of said select data stored in said first memory means is permitted; and a means for supplying said select data change data stored in said second memory means to said arithmetic means only in the case where said select data change enable data stored in said fourth memory means permits the change of said select data when shifting a process from a main program to a subroutine program.

* * * * *